(12) United States Patent
Koishikawa (10) Patent No.: US 9,070,927 B2
(45) Date of Patent: Jun. 30, 2015

(54) EXTERIOR MEMBER FOR BATTERY ELEMENT AND NON-AQUEOUS ELECTROLYTE SECONDARY BATTERY USING THE SAME

(75) Inventor: Toshio Koishikawa, Fukushima (JP)

(73) Assignee: SONY CORPORATION, Tokyo (JP)

( * ) Notice: Subject to any disclaimer, the term of this patent is extended or adjusted under 35 U.S.C. 154(b) by 677 days.

(21) Appl. No.: 12/474,832

(22) Filed: May 29, 2009

(65) Prior Publication Data
US 2009/0297930 A1 Dec. 3, 2009

(30) Foreign Application Priority Data

Jun. 2, 2008 (JP) .................................. 2008-144781

(51) Int. Cl.
*H01M 2/02* (2006.01)
*H01M 2/10* (2006.01)
(52) U.S. Cl.
CPC .......... *H01M 2/1094* (2013.01); *H01M 2/0275* (2013.01); *H01M 2/0287* (2013.01); *H01M 2/1061* (2013.01)
(58) Field of Classification Search
CPC  H01M 2/0275; H01M 2/1061; H01M 2/1094
USPC ....................................................... 429/176
See application file for complete search history.

(56) References Cited

U.S. PATENT DOCUMENTS

| 6,482,544 B1 * | 11/2002 | Shiota et al. ................... 429/185 |
| 2004/0115527 A1 * | 6/2004 | Hiratsuka et al. .............. 429/176 |
| 2006/0046137 A1 * | 3/2006 | Kodama ......................... 429/129 |

FOREIGN PATENT DOCUMENTS

| JP | 2001-199413 | 7/2001 |
| JP | 2001-283915 | 10/2001 |
| JP | 2003-242942 | 8/2003 |

OTHER PUBLICATIONS

Japanese Office Action issued on Oct. 19, 2010, for Japanese Patent Appln. No. 2008-144781.

* cited by examiner

*Primary Examiner* — Ula C Ruddock
*Assistant Examiner* — Archer Dudley
(74) *Attorney, Agent, or Firm* — K&L Gates LLP (57) ABSTRACT

An exterior member for a battery element includes: a first sheet piece made of a laminated sheet; a second sheet piece made of a laminated sheet; a bending part for partitioning the first sheet piece and the second sheet piece from each other; a sealing part which is formed by a peripheral part of the first sheet piece and a peripheral part of the second sheet piece corresponding to the peripheral part of the first sheet piece and which hermetically seals a battery element; and a thick-walled part formed so as to include at least a part of the bending part.

7 Claims, 7 Drawing Sheets

EXTERIOR MEMBER FOR BATTERY ELEMENT AND NON-AQUEOUS ELECTROLYTE SECONDARY BATTERY USING THE SAME

CROSS REFERENCES TO RELATED APPLICATIONS

The present application claims priority to Japanese Priority Patent Application JP 2008-144781 filed in Japan Patent Office on Jun. 2, 2008, the entire contents of which is hereby incorporated by reference.

BACKGROUND

The present application relates to an exterior member for a battery element for packaging a battery element and to a non-aqueous electrolyte secondary battery using the same. In more detail, the present application relates to an exterior member for a battery element capable of reducing failures, for example, leakage of the contents of a battery and swelling of a battery to be caused due to moisture absorption from the outside of the battery, through an enhancement of hermetic sealing properties, and to a non-aqueous electrolyte secondary battery using the same.

In recent years, a number of portable electronic devices, for example, camcorders (video tape recorders), cellular phones and laptop computers, each achieving a reduction in size and weight, have appeared. Following this, a demand for batteries as a power source of portable electronic devices is rapidly increasing. In order to realize a reduction in size and weight of the device, it is demanded to design the battery such that the battery is lightweight and thin and that a housing space within the device can be efficiently used. As a battery capable of meeting such demands, a lithium ion battery with a large energy density and a large output density is the most favorable.

Above all, a battery with a high degree of freedom in shape, a sheet type battery with a thin large area, a card type battery with a thin small area and the like have been desired. However, it is difficult to prepare a thin battery according to techniques using a metal-made can as an exterior material, which have hitherto been employed.

In order to solve these problems, there are investigated batteries not containing a liquid electrolyte therein, by adding a material having a solidification action to an electrolytic solution or using a gel electrolyte using a polymer. In such batteries, an electrode and an electrolyte are brought into intimate contact with each other, and it is possible to keep the contact state. According to this, it is possible to prepare a thin battery using an exterior member in a sheet form, such as an aluminum laminated sheet.

Figure 9:
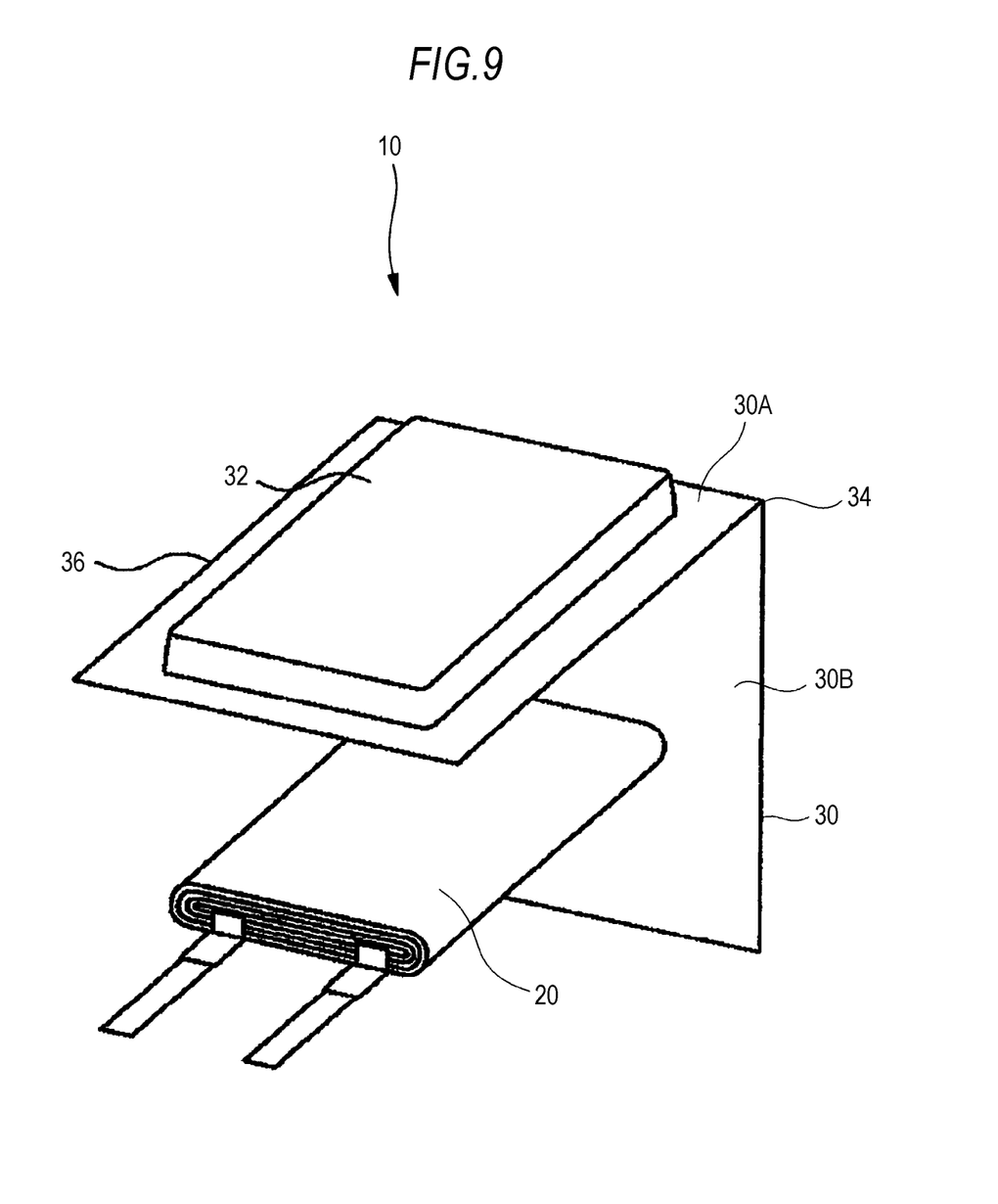
FIG. 9 is an exploded perspective view of a related-art thin battery using a laminated sheet as an exterior member.

FIG. 9 shows an exploded perspective view of the foregoing thin battery using a laminated sheet as an exterior member. This laminated battery 10 is configured such that a battery element 20 is externally packaged in an exterior member 30 for a battery element made of a laminated sheet.

Here, the exterior member 30 for a battery element is formed such that a recess-provided sheet piece 30A having a recess 20 for housing the battery element 20 in a rectangular plate form and a platy sheet piece 30B in a platy form are partitioned from each other by a bending part 34. The laminated battery 10 is prepared by housing the battery element 20 in the recess 32 of the recess-provided sheet piece 30A, folding double the recess-provided sheet piece 30A and the platy sheet piece 30B in the bending part 34 and then sealing a peripheral part 36 of the both sheet pieces under a heat pressure.

The foregoing bending part of the laminated sheet is bent at about 360° C. during sealing and further applied with a load of the heat pressure. Thus, the bending part of the laminated sheet is easily damaged at the time of sealing as compared with other peripheral part (sealing part). Nevertheless, according to the related art, since a sealing region (peripheral part width) of the laminated sheet was sufficiently secured, even when the foregoing load would be applied, the damage was rarely actualized. However, in recent years, following an increase of the battery capacity, not only the sealing region is made narrow to a minimum width, but in order to compensate this, there is a tendency that sealing is carried out at high temperature and high pressure. Accordingly, the foregoing bending part forms a place where delamination or a pinhole which will become a factor of lowering the hermetic sealing properties is easily generated. Thus, it is the present situation that there is a concern that a lowering of the hermetic sealing properties of the thin laminated battery is generated.

On the other hand, there is disclosed a method in which one of external ends of a laminated exterior body is extended to provide an extended end, and the other external end is covered by the extended end, thereby enhancing hermetic sealing properties (see JP-A-2003-242942).

SUMMARY

However, according to the method disclosed in JP-A-2003-242942, the number of the bending part of the laminated sheet increases, and laminated sheet processing is complicated. Thus, the number of manufacturing steps increases, resulting in complicatedness.

In view of the foregoing problems of the related art, it is desirable to provide an exterior member for a battery element which is able to realize excellent hermetic sealing properties and to contribute to realization of a high capacity without increasing the number of manufacturing steps of a battery and to provide a non-aqueous electrolyte secondary battery using the same.

The present inventors have conducted investigations, and as a result, it has been found that with respect to a laminated sheet for forming an exterior member for a battery element, the foregoing desire can be achieved by providing a thick-walled part in at least a part of a bending part in accordance with an embodiment of the present application.

According to an embodiment, there is provided an exterior member for a battery element including:
a first sheet piece made of a laminated sheet;
a second sheet piece made of a laminated sheet;
a bending part for partitioning the first sheet piece and the second sheet piece from each other;
a sealing part which is formed by a peripheral part of the first sheet piece and a peripheral part of the second sheet piece corresponding to the peripheral part of the first sheet piece and which hermetically seals a battery element; and
a thick-walled part formed so as to include at least a part of the bending part.

According to another embodiment, there is provided a non-aqueous electrolyte secondary battery including:
a battery element in a rectangular plate form having a positive electrode and a negative electrode wound therein via a separator; and
an exterior member for a battery element including
a first sheet piece made of a laminated sheet;
a second sheet piece made of a laminated sheet;

a bending part for partitioning the first sheet piece and the second sheet piece from each other;

a sealing part which is formed by a peripheral part of the first sheet piece and a peripheral part of the second sheet piece corresponding to the peripheral part of the first sheet piece and which hermetically seals a battery element; and a thick-walled part formed so as to include at least a part of the bending part.

According to an embodiment, by providing a thick-walled part in at least a part of a bending part with respect to an exterior member for a battery element made of a laminated sheet, it is possible to provide an exterior member for a battery element which is able to realize excellent hermetic sealing properties and to contribute to realization of a high capacity without increasing the number of manufacturing steps of a battery; and to provide a non-aqueous electrolyte secondary battery using the same.

Additional features and advantages are described in, and will be apparent from, the following Detailed Description and the figures.

DETAILED DESCRIPTION

An exterior member for a battery element and a non-aqueous electrolyte secondary battery according to an embodiment of the present application will be described in detail with reference to the accompanying drawings.

(1) Exterior Member for Battery Element

Figure 1:
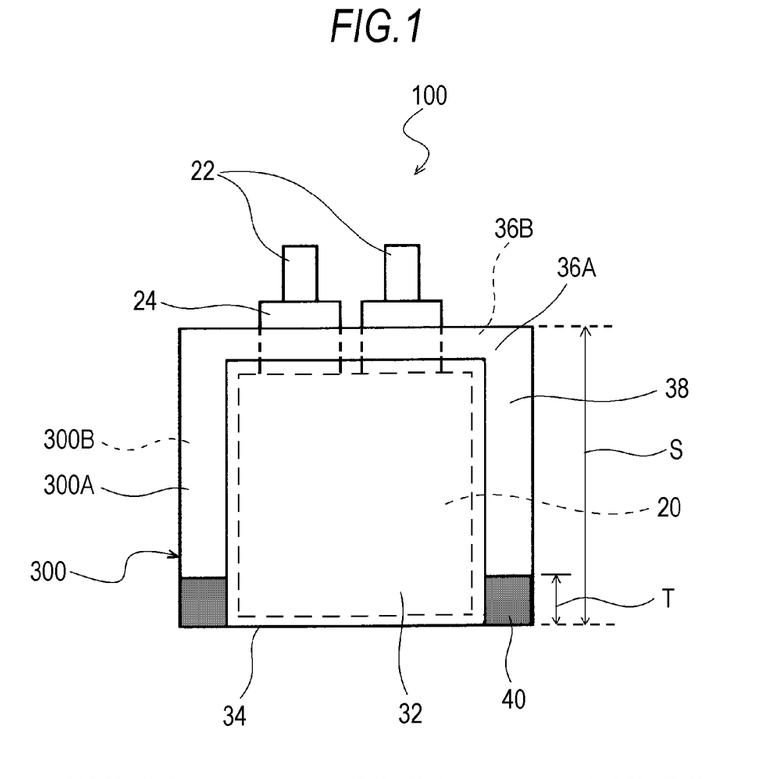
FIG. 1 is a plan view showing the state that a battery element is housed in an exterior member for a battery element according to an embodiment.

FIG. 1 is a plan view showing the state that a battery element is housed in an exterior member for a battery element according to an embodiment.

In FIG. 1, in this exterior member 300 for a battery element, a recess-provided sheet piece 300A made of a laminated sheet, which is one example of a first sheet piece, and a platy sheet piece 300B made of a laminated sheet, which is one example of a second sheet piece, are formed partitioned by a bending part 34, and a thick-walled part 40 is provided so as to include at least a part of the bending part 34.

A non-aqueous electrolyte battery 100 provided with this exterior member 300 for a battery element is prepared by housing a battery element 20 in a recess 32 of the recess-provided sheet piece 300A while leading out a terminal 22 and a sealant 24 of the battery element 20 externally, subsequently folding the platy sheet piece 300B in the bending part 34 to superimpose the both sheet pieces 300A and 300B and heat sealing peripheral parts 36A and 36B of the both sheet pieces (the peripheral parts of the both sheet pieces will be hereinafter sometimes referred to simply as "peripheral part 36") to form a sealing part 38.

In the present embodiment, though the recess for housing a battery element is provided only in the first sheet piece, the form of each of the first sheet piece and the second sheet piece is not limited so far as it is able to house the battery element therein. For example, (1) a form in which each of the first sheet piece and the second sheet piece has a recess which forms a half of a battery element-housing part; (2) a form in which only the second sheet piece has a recess for housing the battery element therein; (3) a platy form in which both the first sheet piece and the second sheet piece do not have a recess, and the battery element can be housed while interposing it by the both sheet pieces; and the like can be adopted.

Though the thick-walled part 40 is formed under a heat pressing simultaneously with heat sealing for forming the sealing part 38 in the peripheral part 36 in which the bending part 34 is included, it is preferable that the thick-walled part 40 is formed by a pressure lower than a pressure the sealing part 38 is formed by. The thick-walled part 40 is able to relieve a damage from which the bending part 34 suffers during this heat sealing and to significantly suppress the generation of delamination or a pinhole in the bending part 34 or in the vicinity thereof.

Accordingly, the non-aqueous electrolyte battery of the present embodiment having the foregoing configuration and having enhanced sealing properties hardly generates failures, for example, leakage of the contents of a battery and swelling of a battery to be caused due to moisture absorption from the outside of the battery.

Though the thickness of the thick-walled part 40 may be uniform or non-uniform, the thickness of a thickest portion thereof is preferably from 1.2 to 3 times, and more preferably from 1.2 to 2 times the thickness of the sealing part 38 where no thick-walled part is formed.

This is because when the thickness of the thick-walled part 40 is less than 1.2 times, there may be the case where an effect for reducing the damage at the time of heat sealing is not obtained, whereas when it exceeds 3 times, there may be the case where the sealing part becomes thick so that the penetration amount of moisture increases, leading to a factor of swelling of the battery.

Also, a length (T) in the long side direction of the thick-walled part 40, namely the length of the thick-walled part 40 formed in the terminal-leading direction from the bending part 34, is preferably not more than 80% relative to a length (S) of the long side of the exterior member 300 for a battery element, namely the length in the lead-out direction of the terminal 22. It is preferable that this proportion is small as far as possible. This is because in a portion where the thickness of the sealing part 38 formed in the exterior member for a battery element is thick, the penetration amount of moisture increases, leading to a factor of swelling of the battery, and therefore, when the subject proportion exceeds 80%, a risk of the generation of swelling of the battery increases. Also, this is because the volume of the whole of the battery increases in vain, resulting in going against the realization of a high capacity of the battery.

Figure 2A:
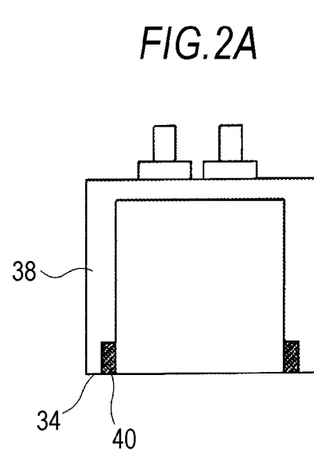
FIGS. 2A, 2B and 2C are plan views each showing the state that a battery element is housed in an exterior member for a battery element according to another embodiment.
Figure 2B:
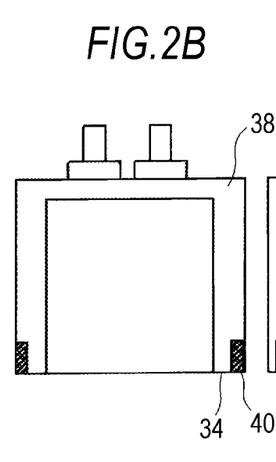
Figure 2C:
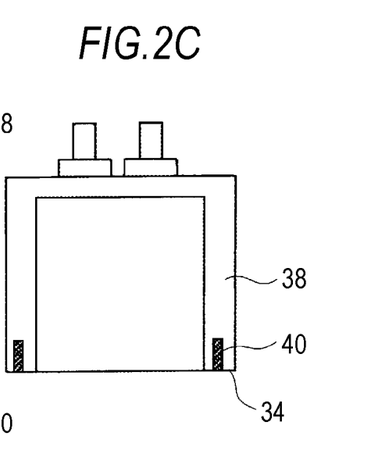

FIGS. 2A, 2B and 2C are plan views each showing the state that a battery element is housed in an exterior member for a battery element according to another embodiments, respectively.

As shown in these three embodiments, the thick-walled part 40 does not necessarily extend over the whole width of the bending part 34 but may include at least a part thereof. Also, as to the shape of the thick-walled part 40, it can be formed in an arbitrary shape in terms of a planar shape thereof, such as a semicircular shape, a triangular shape and a polygonal shape, in addition to a rectangular shape as shown in FIGS. 2A, 2B and 2C.

Figure 3A:
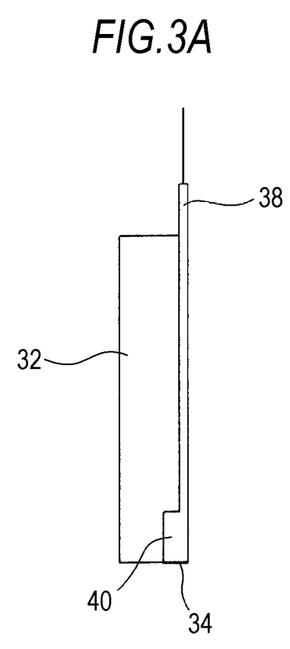
FIGS. 3A, 3B and 3C are side views each showing the state that a battery element is housed in an exterior member for a battery element according to another embodiment.
Figure 3B:
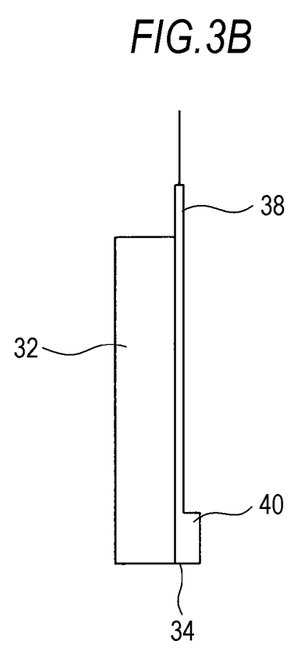
Figure 3C:
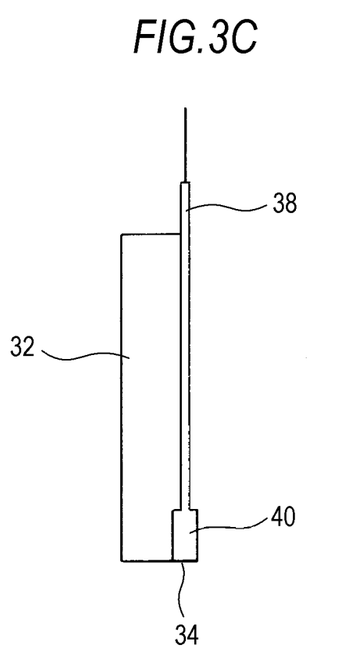

FIGS. 3A, 3B and 3C are side views each showing the state that a battery element is housed in an exterior member for a battery element according to still another embodiment.

As shown in these three embodiments, the thick-walled part 40 can take a form in which it is protruded in an arbitrary direction. Examples of such a form include a form in which the thick-walled part 40 is protruded on the side having the recess 32 for housing a battery element therein (FIG. 3A); a form in which the thick-walled part 40 is protruded on the opposite side thereto (FIG. 3B); and a form in which the thick-walled part 40 is protruded on the both sides (FIG. 3C).

Figure 4:
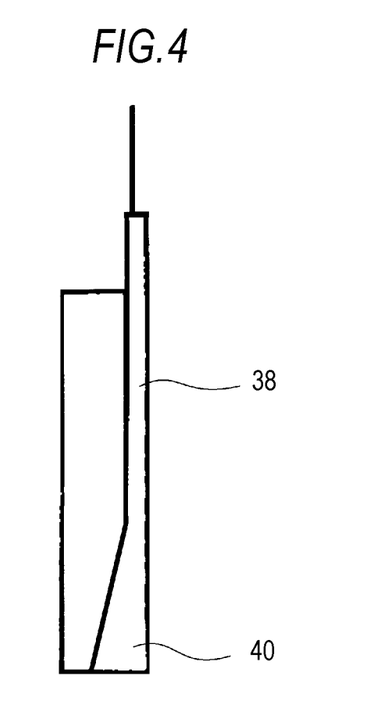
FIG. 4 is a side view showing the state that a battery element is housed in an exterior member for a battery element according to yet another embodiment.

FIG. 4 is a side view showing the state that a battery element is housed in an exterior member for a battery element according to an even still another embodiment.

The thick-walled part 40 may have a level difference from the sealing part 38 as in the previously shown embodiments shown in FIGS. 3A to 3C or may have an inclination relative to the sealing part 38 as in the embodiment shown in FIG. 4. Also, the slope of forming an inclination is not necessarily a smooth face but may be, for example, a curved face.

The laminated sheet which forms each of the recess-provided sheet piece 300A and the platy sheet piece 300B is, for example, a rectangular sheet obtained by sticking a nylon film, an aluminum foil and a polyethylene film in this order. The laminated sheet is sealed by, for example, folding double it in the bending part such that the polyethylene film side faces toward the inside and sealing the peripheral part 36A of the recess-provided sheet piece 300A and the peripheral part 36B of the platy sheet piece 300B as superimposed each other through heat sealing.

Also, for the purpose of preventing penetration of the air, it is preferable that the sealant 24 is inserted between the laminated sheet and each of the positive electrode and negative electrode terminals 22 as shown in FIG. 1. The sealant 24 is constituted of a material having adhesion to each of the positive electrode and negative electrode terminals 22. For example, when such terminals are each constituted of a metal material, it is preferable that the sealant 24 is constituted of a polyolefin resin such as polyethylene, polypropylene, modified polyethylene and modified polypropylene.

A general configuration of the laminated sheet can be expressed by a laminate structure of exterior layer/metal foil/sealant layer (however, the exterior layer and the sealant layer are sometimes configured of plural layers). In the foregoing example, the nylon film is corresponding to the exterior layer, the aluminum foil is corresponding to the metal foil, and the polyethylene film is corresponding to the sealant layer.

It is sufficient that the metal foil functions as a barrier membrane having water vapor permeation resistance. As the metal foil, not only the aluminum foil but a stainless steel foil, a nickel foil and a plated iron foil are useful. Of these, the aluminum foil which is thin and lightweight and is excellent in workability can be favorably used.

Examples of a mode of the configuration (exterior layer/metal foil/sealant layer) which can be used as the laminated sheet to be used as the exterior member for a battery element according to an embodiment include Ny (nylon)/Al (aluminum)/CPP (cast polypropylene), PET (polyethylene terephthalate)/Al/CPP, PET/Al/PET/CPP, PET/Ny/Al/CPP, PET/Ny/Al/Ny/CPP, PET/Ny/Al/Ny/PE (polyethylene), Ny/PE/Al/LLDPE (linear low density polyethylene), PET/PE/Al/PET/LDPE (low density polyethylene) and PET/Ny/Al/LDPE/CPP. However, it should be understood that the present application is not limited to the above-referenced examples.

The exterior member for a battery element according to an embodiment may also be constituted of a laminated sheet having other structure, for example, a metal material-free laminated sheet, in place of the foregoing laminated sheet.

Figure 5A:
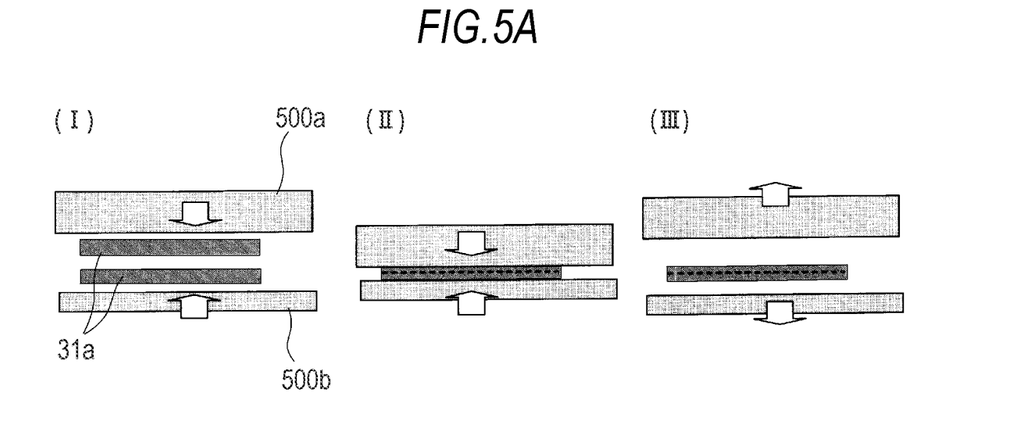
FIGS. 5A, 5B and 5C are schematic views each showing a manufacturing method of an exterior member for a battery element of the related art and that according to an embodiment.
Figure 5B:
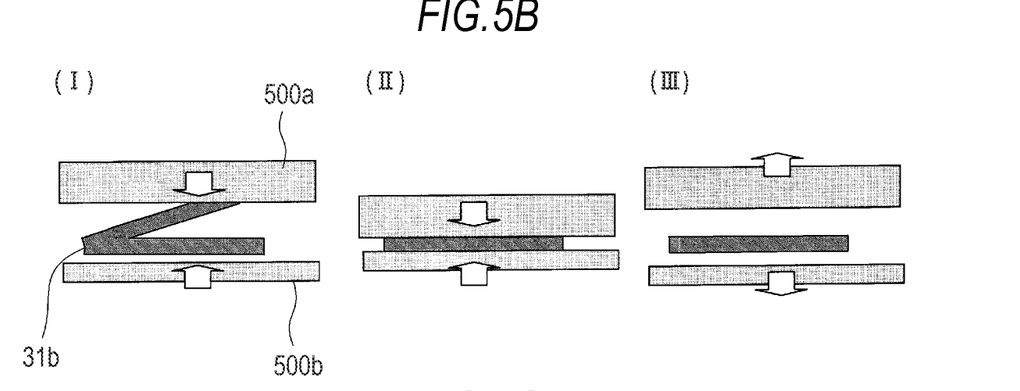
Figure 5C:
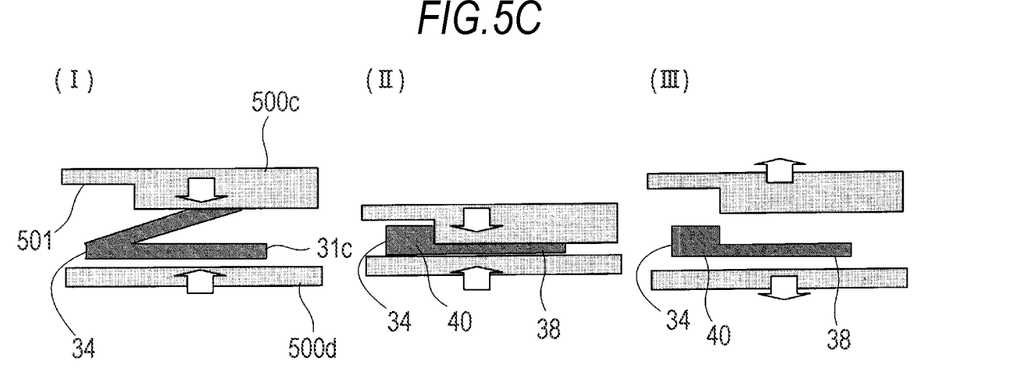

Next, a method for manufacturing an exterior member for a battery element according to an embodiment is described with reference to FIGS. 5A, 5B and 5C. In FIGS. 5A, 5B and 5C, though there may be the case where each laminated sheet has a recess for housing a battery element therein, illustration is omitted.

Heretofore, as shown in FIGS. 5A and 5B, an exterior member for a battery element was manufactured by heat sealing two laminated sheets 31a or a double-folded laminated sheet 31b using a pair of heater bars 500a and 500b in a platy shape.

Specifically, first of all, the two laminated sheets 31a or the double-folded laminated sheet 31b which will be a material is disposed between a pair of the heated heater bars 500a and 500b, or between the heated heater bar 500a (or 500b) and the non-heated other heater bar 500b (or 500a), such that the respective adhesive layers of the laminated sheet or sheets face inward (see FIG. 5A-(I) and FIG. 5B-(I)). Subsequently, the laminated sheet or sheets are interposed by the heater bars 500a and 500b and heat pressed to form a sealing part (see FIG. 5A-(II) and FIG. 5B-(II)), thereby obtaining the exterior member for a battery element (see FIG. 5A-(III) and FIG. 5B-(III)).

On the other hand, in the manufacture of an exterior member for a battery element according to an embodiment, for example, a level difference-provided heater bar 500c and a heater bar 500d in a platy shape as shown in FIG. 5C can be used in place of the related-art pair of heater bars in a platy shape.

The level difference-provided heater bar 500c is provided with a level difference portion 501 such that a degree of heat pressure applied to a portion where the thick-walled part 40 is formed, namely a portion including the bending part 34, is smaller than a degree of heat pressure applied to other sealing part 38.

In the method for manufacturing an exterior member for a battery element according to an embodiment, for example, a laminated sheet 31c which has been folded double in the bending part 34 is first disposed between a pair of the heated heater bars 500c and 500d, or between the heated heater bar 500c (or 500d) and the non-heated other heater bar 500d (or 500c), such that the respective adhesive layers of the laminated sheet or sheets 31c face inward and that the bending part 34 is corresponding to the level difference portion 501 (see FIG. 5C-(I)).

Subsequently, the laminated sheet 31c is interposed by the heater bars 500c and 500d (see FIG. 5C-(II)). At that time, the portion where the thickness-walled part 40 is formed is heat pressed relatively lightly, whereby the portion where the other sealing part 38 is formed is heat pressed to the same degree as in the related art. Thus, the thick-walled part 40 having desired thickness, width and length is formed by controlling the shape of the level difference portion 501 and the like, thereby obtaining the exterior member for a battery element according to an embodiment (see FIG. 5C-(III)).

Figure 6:
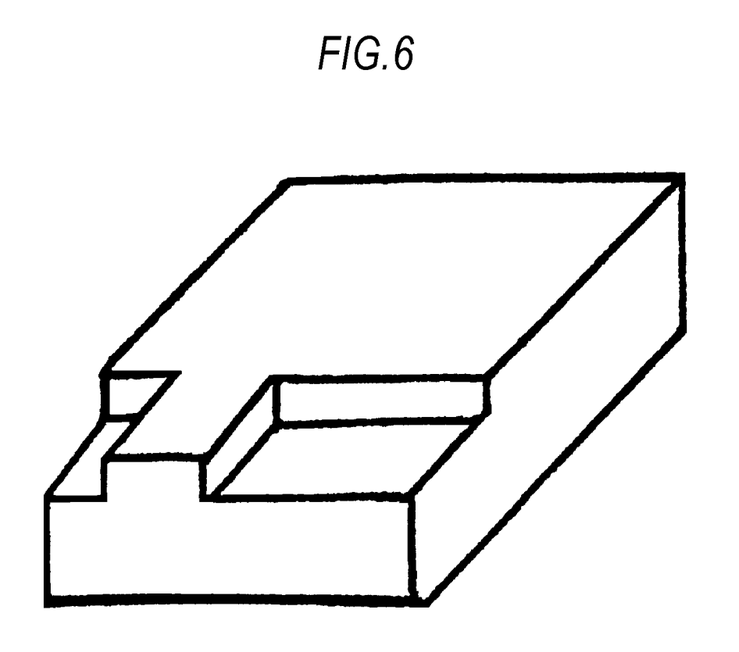
FIG. 6 is a perspective view showing a heater bar to be used for the manufacture of an exterior member for a battery element according to an embodiment.

Also, for example, in the case where a thick-walled part including only a part of the bending part is formed as in the embodiments as shown in FIGS. 2A, 2B and 2C, a heater bar having a shape as shown in FIG. 6 can be used.

Furthermore, as other manufacturing method, there can be exemplified a method in which heat sealing is carried out dividedly twice using a pair of heater bars in a platy shape, the manner of which has hitherto been employed.

Specifically, first of all, the whole of the portion for forming a sealing part is interposed by the foregoing heater bars in a platy shape, and first heat sealing is carried out relatively weakly (at a low temperature under a low pressure). Subsequently, the heater bars are shifted, the laminated sheet is interposed by the heater bars while avoiding the portion for forming a thick-walled part, and second heat sealing is carried out relatively strongly (at a high temperature under a high pressure for a long period of time). In this way, by carrying out the heat sealing dividedly twice under different conditions, an exterior member for a battery element having a thick-walled part formed only by heat sealing under a low-temperature and low-pressure condition is obtained.

An example of the condition which is employed in the subject method is shown in Table 1.

TABLE 1

| | Temperature of heater bar | Heater bar to be heated | Pressure of air to be fed into heater bar cylinder | Heat pressing time |
|---|---|---|---|---|
| Weak condition | 190° C. | Only one of a pair of heater bars | 0.15 MPa | 3 seconds |
| Strong condition | 200° C. | Both of a pair of heater bars | 0.2 MPa | 3 seconds |

(2) Non-Aqueous Electrolyte Secondary Battery

Next, the non-aqueous electrolyte secondary battery according to an embodiment is described in detail.

Figure 7:
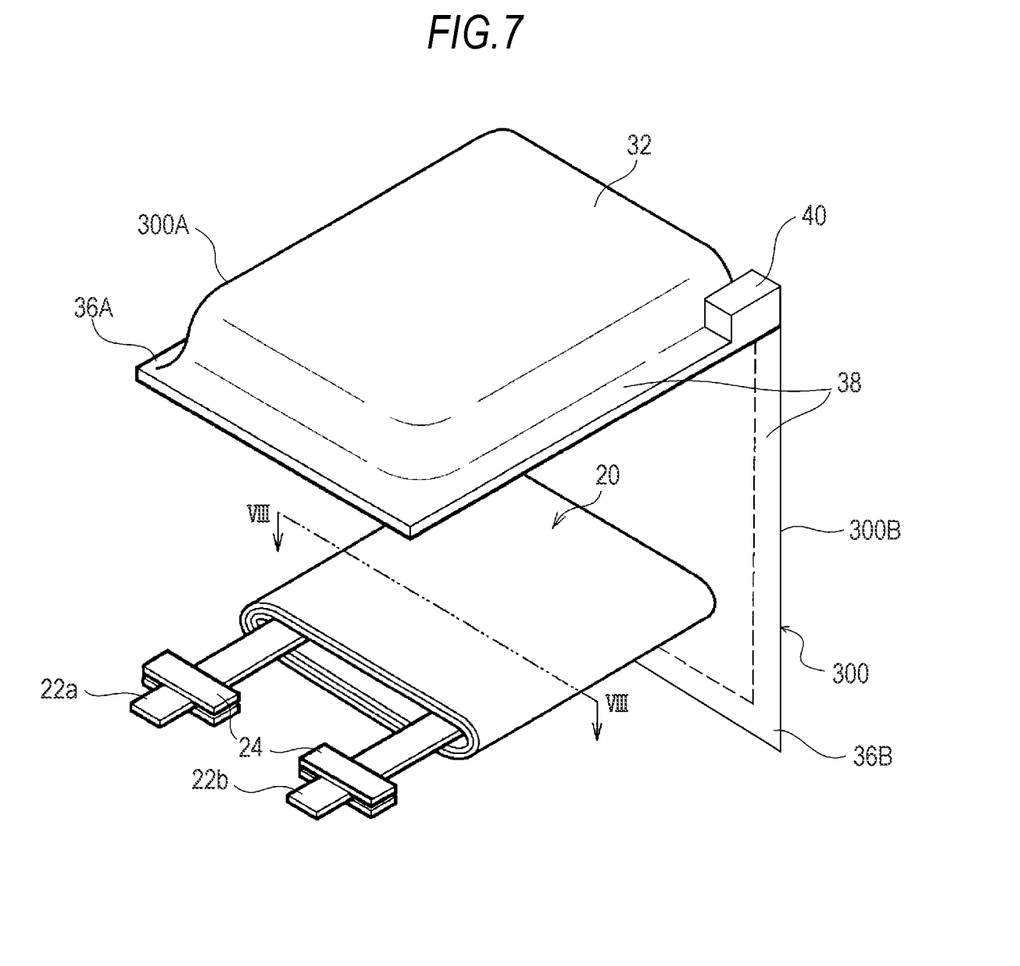
FIG. 7 is an exploded perspective view showing a non-aqueous electrolyte secondary battery according to an embodiment.

FIG. 7 is an exploded perspective view showing a non-aqueous electrolyte secondary battery according to an embodiment.

In FIG. 7, this secondary battery is formed by enclosing the wound battery element 20 installed with a positive electrode terminal 22a and a negative electrode terminal 22b in the recess 32 of the exterior member 300 for a battery element having a configuration such that the recess-provided sheet piece 300A which is one example of the first sheet piece and the platy sheet piece 300B which is one example of the second sheet piece are partitioned from each other by the bending part 34. Also, the positive electrode terminal 22a and the negative electrode terminal 22b are each led out in, for example, the same direction from the inside to the outside of the exterior member 300 for a battery element. The positive electrode terminal 22a and the negative electrode terminal 22b are each constituted of a metal material, for example, aluminum (Al), copper (Cu), nickel (Ni) and stainless steel.

The recess-provided sheet piece 300A and the platy sheet piece 300B are each formed of, for example, a rectangular laminated film obtained by sticking a nylon film, an aluminum foil and a polyethylene film in this order as described previously, and the peripheral parts 36A and 36B of the both sheet pieces are superimposed and heat sealed to form the sealing part 38. Also, the portion including the bending part 34 in the sealing part 38 has the thick-walled part 40. Furthermore, the sealant 24 for preventing penetration of the air is inserted between the recess-provided sheet piece 300A and the platy sheet piece 300B and between the positive electrode terminal 22a and the negative electrode terminal 22b.

Figure 8:
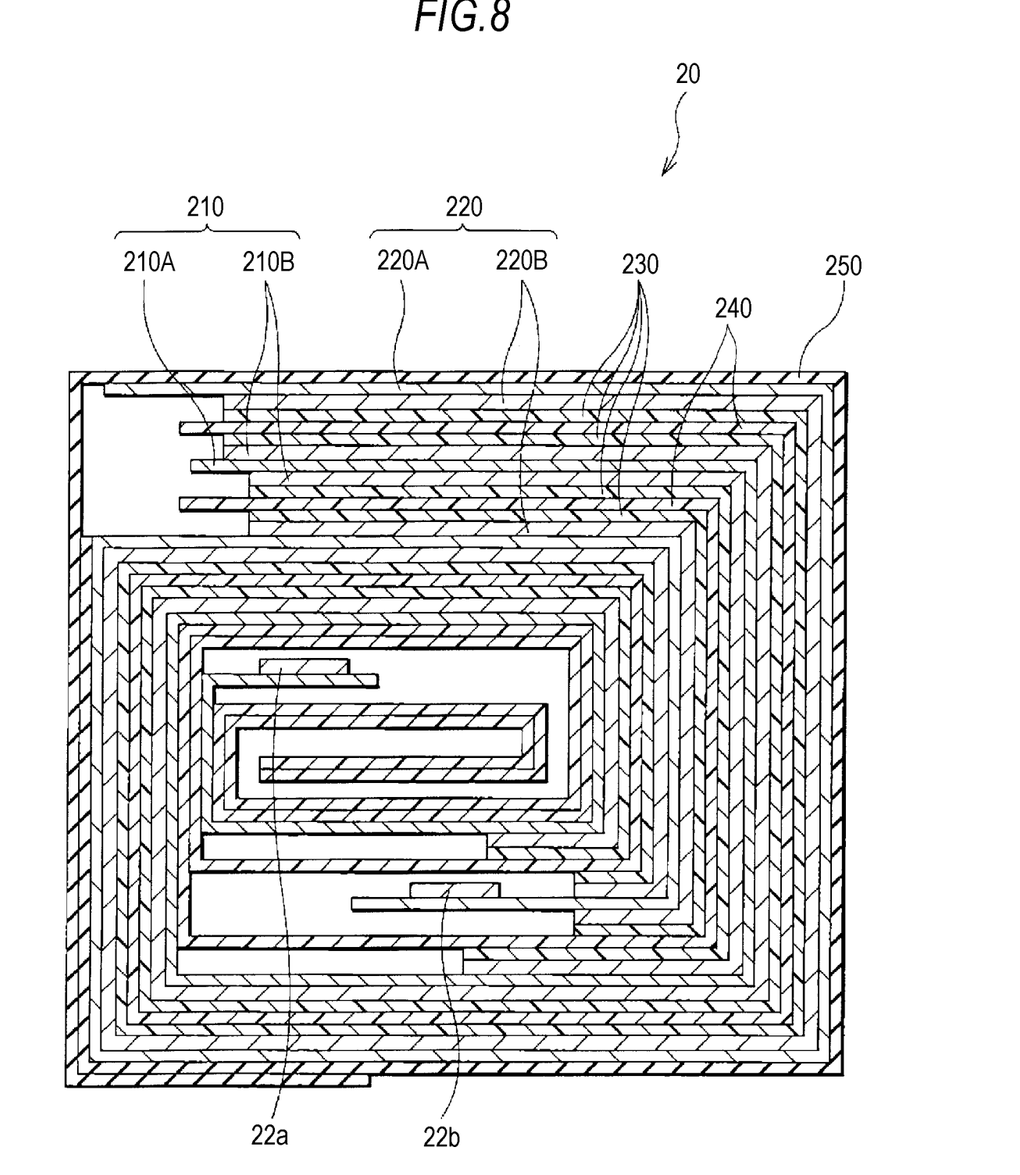
FIG. 8 is a schematic cross-sectional view along a VIII-VIII line of the battery element shown in FIG. 7.

FIG. 8 is a schematic cross-sectional view along a VIII-VIII line of the battery element 20 shown in FIG. 7.

In FIG. 8, in the battery element 20, a positive electrode 210 and a negative electrode 220 are disposed opposing to each other and wound via a polymeric support layer (as described later) 230 which holds a non-aqueous electrolytic solution and a separator 240; and an outermost peripheral part thereof is protected by a protective tape 250.

As shown in FIG. 8, for example, the positive electrode 210 has a structure in which a positive electrode active material layer 210B is coated on the both surfaces or one surface of a positive electrode collector 210A having a pair of opposing surfaces. The positive electrode collector 210A includes a portion where the positive electrode active material layer 210B is exposed without being coated, in one end in the longitudinal direction, and the positive electrode terminal 22a is installed in this exposed portion.

The positive electrode collector 210A is constituted of a metal foil, for example, an aluminum foil, a nickel foil and a stainless steel foil.

The positive electrode active material layer 210B contains, as a positive electrode active material, any one kind or two or more kinds of a positive electrode material capable of intercalating and deintercalating a lithium ion and may contain a conductive agent and a binder as the need arises.

Examples of the positive electrode material capable of intercalating and deintercalating a lithium ion include lithium-free chalcogen compounds (especially, layered compounds and spinel type compounds), for example, sulfur (S), iron disulfide ($FeS_2$), titanium disulfide ($TiS_2$), molybdenum disulfide ($MOS_2$), niobium diselenide ($NbSe_2$), vanadium oxide ($V_2O_5$), titanium dioxide ($TiO_2$) and manganese dioxide ($MnO_2$); lithium-containing compounds containing lithium therein; and conductive polymer compounds, for example, polyaniline, polythiophene, polyacetylene and polypyrrole.

Of these, lithium-containing compounds are preferable because they include ones capable of obtaining high voltage and high energy density. Examples of such a lithium-containing compound include complex oxides containing lithium and a transition metal element; and phosphate compounds containing lithium and a transition metal. From the viewpoint of obtaining a higher voltage, those containing cobalt (Co), nickel (Ni), manganese (Mn), iron (Fe), copper (Cu), zinc (Zn), chromium (Cr), vanadium (V), titanium (Ti) or an arbitrary mixture thereof are preferable.

Such a lithium-containing compound is representatively represented by the following general formula (1) or (2).

$$Li_xM^IO_2 \quad (1)$$

$$Li_yM^{II}PO_4 \quad (2)$$

In the foregoing formulae, $M^I$ and $M^{II}$ each represents one or more kinds of a transition metal element; and values of x and y vary depending upon the charge-discharge state of the battery and are usually satisfied with $0.05 \leq x \leq 1.10$ and $0.05 \leq y \leq 1.10$, respectively. The compound of the formula (1) generally has a layered structure; and the compound of the formula (2) generally has an olivine structure.

Also, specific examples of the complex oxide containing lithium and a transition metal element include a lithium cobalt complex oxide ($Li_xCoO_2$), a lithium nickel complex oxide ($Li_xNiO_2$), lithium nickel cobalt complex oxide ($Li_xNi_{1-z}Co_zO_2$) ($0<z<1$)) and a lithium manganese complex oxide having a spinel structure ($LiMn_2O_4$).

Specific examples of the phosphate compound containing lithium and a transition metal element include a lithium iron phosphate compound having an olivine structure ($LiFePO_4$) and a lithium iron manganese phosphate compound ($LiFe_{1-v}Mn_vPO_4$ ($v<1$)).

In these complex oxides, for the purpose of stabilizing the structure or the like, ones in which a part of the transition metal is substituted with Al, Mg or other transition metal element or contained in a crystal grain boundary and ones in which a part of oxygen is substituted with fluorine, etc, can be exemplified. Furthermore, at least a part of the surface of the positive electrode active material may be coated with other positive electrode active material. Also, a mixture of plural kinds of materials may be used as the positive electrode active material.

On the other hand, likewise the positive electrode 210, the negative electrode 220 has, for example, a structure in which a negative electrode active material layer 220B is provided on the both surfaces or one surface of a negative electrode collector 220A having a pair of opposing surfaces. The negative electrode collector 220A has a portion which is exposed without being provided with the negative electrode active material layer 220B in one end in the longitudinal direction thereof, and the negative electrode terminal 22b is installed in this exposed portion.

The negative electrode collector 220A is constituted of a metal foil, for example, a copper foil, a nickel foil and a stainless steel foil.

The negative electrode active material layer 220B contains, as a negative electrode active material, any one kind or two or more kinds of a negative electrode material capable of intercalating and deintercalating a lithium ion and metallic lithium and may contain a conductive agent and a binder as the need arises.

Examples of the negative electrode material capable of intercalating and deintercalating lithium include carbon materials, metal oxides and polymer compounds. Examples of the carbon material include hardly graphitized carbon materials, artificial graphite materials and graphite based materials. More specific examples thereof include pyrolytic carbons, cokes, graphites, vitreous carbons, organic polymer compound burned materials, carbon fibers, active carbon and carbon black.

Of these, examples of the coke include pitch coke, needle coke and petroleum coke. The organic polymer compound burned material as referred to herein is a material obtained through carbonization by burning a polymer material, for example, phenol resins and furan resins at an appropriate temperature. Also, examples of the metal oxide include iron oxide, ruthenium oxide and molybdenum oxide; and examples of the polymer material include polyacetylene and polypyrrole.

Furthermore, examples of the negative electrode material capable of intercalating and deintercalating lithium include materials containing, as a constitutional element, at least one of metal elements and semi-metal elements capable of forming an alloy together with lithium. This negative electrode material may be a single body, an alloy or a compound of a metal element or a semi-metal element. Also, one having one or two or more kinds of a phase in at least a part thereof may be used.

In an embodiment, the alloy also includes an alloy containing one or two or more kinds of a metal element and one or two or more kinds of a semi-metal element in addition to alloys composed of two or more kinds of a metal element. Also, the alloy may contain a non-metal element. Examples of its texture include a solid solution, a eutectic (eutectic mixture), an intermetallic compound and one in which two or more kinds thereof coexist.

Examples of such a metal element or semi-metal element include tin (Sn), lead (Pb), aluminum, indium (In), silicon (Si), zinc (Zn), antimony (Sb), bismuth (Bi), gallium (Ga), germanium (Ge), arsenic (As), silver (Ag), hafnium (Hf), zirconium (Zr) and yttrium (Y).

Above all, a metal element or a semi-metal element belonging to the Group 14 of the long form of the periodic table is preferable; and silicon or tin is especially preferable. This is because silicon and tin have a large ability to intercalate and deintercalate lithium and are able to obtain a high energy density.

Examples of alloys of tin include alloys containing, as a second constitutional element other than tin, at least one member selected from the group consisting of silicon, magnesium (Mg), nickel, copper, iron, cobalt, manganese, zinc, indium, silver, titanium (Ti), germanium, bismuth, antimony and chromium (Cr).

Examples of alloys of silicon include alloys containing, as a second constitutional element other than silicon, at least one member selected from the group consisting of tin, magnesium, nickel, copper, iron, cobalt, manganese, zinc, indium, silver, titanium, germanium, bismuth, antimony and chromium.

Examples of compounds of tin or silicon include compounds containing oxygen (O) or carbon (C), and these compounds may contain the foregoing second constitutional element in addition to tin or silicon.

Next, the polymeric support layer 230 has ion conductivity and is able to hold a non-aqueous electrolytic solution therein. In the embodiment as shown in FIG. 8, this polymeric support layer 230 comes into intimate contact with or adheres to the separator 240. The polymeric support layer 230 may come into intimate contact with or adhere to the separator and the electrode as in the separator 240 and the positive electrode 210 or the separator 240 and the negative electrode 220. Alternatively, the polymeric support layer 230 may not come into intimate contact with or adhere to the separator but come into intimate contact with or adhere to either one or both of the positive electrode 210 and the negative electrode 220.

It is meant by the terms "intimate contact" as referred to herein that the polymeric support layer 230 comes into contact with the separator 240 or the positive electrode 210 or the negative electrode 220 closely to an extent that they do not relatively move each other unless a prescribed force is added.

When the polymeric support layer 230 and the separator 240, or the polymeric support layer 230 and the positive electrode or negative electrode come into intimate contact with or adhere to each other, the polymeric support layer 230 holds a non-aqueous electrolytic solution therein and becomes a gel non-aqueous electrolyte layer, whereby the positive electrode 210 or the negative electrode 220 and the separator 240 adhere to each other via this non-aqueous electrolyte layer.

The degree of this adhesion is preferably a degree such that, for example, a peel strength between the separator and the exposed portion of the positive electrode 210 or the negative electrode 220 where the active material layer is not provided, but the collector is exposed is 5 mN/mm or more. The peel strength is an average value of the force required to peel the collector disposed on a supporting table from the separator while pulling at a rate of 10 cm/min in the 180° direction within a time period of from 6 seconds to 25 seconds after start of the pulling.

By such intimate contact or adhesion, in the non-aqueous electrode secondary battery according to an embodiment, an excess of the non-aqueous electrolytic solution which does not substantially contribute to a battery reaction can be reduced, and the non-aqueous electrolytic solution is efficiently fed into the surroundings of the electrode active material. Accordingly, the non-aqueous electrolyte secondary battery according to an embodiment exhibits desirable cycle characteristics even with a smaller amount of the non-aqueous electrolytic solution than that of the related art. Also, since the amount of the non-aqueous electrolytic solution to be used is small, the resistance to liquid leakage is desirable.

The polymeric support which constitutes the foregoing polymeric support layer is not particularly limited so far as it holds the non-aqueous electrolytic solution therein, thereby exhibiting ion conductivity. Examples thereof include acrylonitrile based polymers having a copolymerization amount of acrylonitrile of 50% by mass or more, and especially 80% by mass or more, aromatic polyamides, acrylonitrile/butadiene copolymers, acrylic polymers composed of an acrylate or methacrylate homopolymer or copolymer, acrylamide based polymers, fluorine-containing polymers of vinylidene fluoride, etc., polysulfones and polyarylsulfones. In particular, a polymer having a copolymerization amount of acrylonitrile of 50% by mass or more has a CN group in a side chain thereof, and thus, it is able to form a polymeric gel electrolyte with high dielectric constant and high ion conductivity.

In order to enhance the supporting properties of the non-aqueous electrolytic solution relative to such a polymer or enhance the ion conductivity of the polymeric gel electrolyte from such a polymer, copolymers obtained by copolymerizing acrylonitrile with a vinyl carboxylic acid (for example, acrylic acid, methacrylic acid and itaconic acid), acrylamide, methacrylsufonic acid, a hydroxyalkylene glycol (meth)acrylate, an alkoxyalkylene glycol (meth)acrylate, vinyl chloride, vinylidene chloride, vinyl acetate, a (meth)acrylate of every sort, etc. in a proportion of preferably not more than 50% by mass, and especially not more than 20% by mass can be used.

Also, the aromatic polyamide is a high heat-resistant polymer. Thus, in the case where a polymeric gel electrolyte which is required to have high heat resistance as in automobile batteries is required, the aromatic polyamide is a preferred polymer compound. A polymer having a crosslinking structure which is obtained through copolymerization with butadiene, etc. can also be used.

In particular, polymers containing, as a constitutional component, vinylidene fluoride, namely homopolymers, copolymers and multi-component copolymers are preferable as the polymeric support. Specific examples thereof include polyvinylidene fluoride (PVdF), a polyvinylidene fluoride-hexafluoropropylene copolymer (PVdF-HFP) and a polyvinylidene fluoride-hexafluoropropylene-chlorotrifluoroethylene copolymer (PVdF-HEP-CTFE).

Next, the separator 240 is usually configured to have an insulating thin membrane having high ion permeability and predetermined mechanical strength, such as a porous membrane composed of a polyolefin based resin or a porous membrane composed of an inorganic material such as a non-woven fabric made of a ceramic, or the like. However, in the non-aqueous electrolyte secondary battery according to the present embodiment, it is preferable that the separator 240 is configured to have a porous membrane containing polyethylene as a main component and containing not more than 10% by mass of polypropylene.

Here, in the separator in which polyethylene and polypropylene coexist, since a melting point of polypropylene is higher than that of polyethylene, the start temperature of heat shrinkage can be shifted to a higher temperature side. Inversely, since a shutdown function-revealing temperature of polypropylene is high, the battery temperature at the time of overcharge or internal short circuit easily becomes high, and therefore, thermorunaway is easily caused.

According to an embodiment, by making a mixing ratio of polyethylene and polypropylene fall within the foregoing range, the start temperature of heat shrinkage can be increased while keeping the shutdown function-revealing temperature low.

While the start temperature of heat shrinkage is low as compared with the case of 100% by mass of polypropylene, according to an embodiment, the separator and the electrode firmly adhere to each other by the foregoing polymeric support, and therefore, it is possible to adequately control the heat shrinkage. Furthermore, according to such a structure where the polymeric support is arranged, since the separator itself can be made thin, the energy density of the battery can be kept high.

Also, as constitutional components of the foregoing separator, it is preferable to choose polyethylene having a melting point of from about 130 to 140° C. or polypropylene having a melting point of from about 160 to 170° C.

When a material having an excessively low melting point is contained as the constitutional component of the separator, a temperature at which the separator fuses is low so that the useful temperature becomes low. On the other hand, when a material having an excessively high melting point is contained as the constitutional component of the separator, a temperature at which the separator reveals the shutdown function is high so that thermorunaway is possibly caused, whereby there may be the case where it is difficult to secure the safety. Also, when there is a difference in melting point of 20° C. or more in the plural constitutional components, the functions including both shutdown and avoidance of the heat shrinkage can be sufficiently obtained.

A thickness of the separator is preferably from 5 to 20 μm.

Next, the non-aqueous electrolytic solution may be any solution containing an electrolyte salt and a non-aqueous solvent.

Here, the electrolyte salt may be any salt capable generating an ion upon being dissolved or dispersed in a non-aqueous solvent as described later. Though lithium hexafluorophosphate ($LiPF_6$) can be favorably used, needless to say, the electrolyte salt is not limited thereto.

That is, inorganic lithium salts, for example, lithium tetrafluoroborate ($LiBF_4$), lithium hexafluoroarsenate ($LiAsF_6$), lithium hexafluoroantimonate ($LiSbF_6$), lithium perchlorate ($LiClO_4$) and lithium tetrachloroaluminate ($LiAlCl_4$); lithium salts of a perfluoroalkanesulfonate derivative, for example, lithium trifluoromethanesulfonate ($LiCF_3SO_3$), lithium bis(trifluoromethanesulfone)imide ($LiN(CF_3SO_2)_2$), lithium bis(pentafluoromethanesulfone)imide ($LiN(C_2F_5SO_2)_2$) and lithium tris-(trifluoromethanesulfone)methide ($LiC(CF_3SO_2)_3$) can be used. These salts can be used singly or in combinations of two or more kinds thereof.

The content of such an electrolyte salt is preferably from 5 to 25% by mass. When the content of such an electrolyte salt is less than 5% by mass, there is a concern that sufficient conductivity is not obtainable. On the other hand, when it exceeds 25% by mass, there is a concern that the viscosity excessively increases.

Also, examples of the non-aqueous solvent include various high-dielectric solvents and low-viscosity solvents.

Ethylene carbonate or propylene carbonate or the like can be favorably used as the high-dielectric solvent, but the high-dielectric solvent is not limited thereto. Other examples of the high-dielectric solvent include cyclic carbonates, for example, butylene carbonate, vinylene carbonate, 4-fluoro-1, 3-dioxolan-2-one (fluoroethylene carbonate), 4-chloro-1,3-dioxolan-2-one (chloroethylene carbonate) and trifluoromethylethylene carbonate.

Also, in place of, or in addition to, the cyclic carbonate, a lactone, for example, γ-butyrolactone and γ-valerolactone, a lactam, for example, N-methylpyrrolidone, a cyclic carbamic ester, for example, N-methyloxazolidinone, a sulfone compound, for example, tetramethylene sulfone or the like can be used as the high-dielectric solvent.

On the other hand, diethyl carbonate can be favorably used as the low-viscosity solvent. Besides, chain carbonates, for example, dimethyl carbonate, ethyl methyl carbonate and methyl propyl carbonate; chain carboxylic esters, for example, methyl acetate, ethyl acetate, methyl propionate, ethyl propionate, methyl butyrate, methyl isobutyrate, methyl trimethylacetate and ethyl trimethylacetate; chain amides, for example, N,N-dimethylacetamide; chain carbamic esters, for example, methyl N,N-diethylcarbamate and ethyl N,N-diethylcarbamate; and ethers, for example, 1,2-dimethoxyethane, tetrahydrofuran, tetrahydropyran and 1,3-dioxolane.

As the non-aqueous electrolytic solution to be used in the non-aqueous electrolyte secondary battery according to an embodiment, the foregoing high-dielectric solvent and low-viscosity solvent can be used singly or in admixture of two or more kinds thereof at any desired mixing ratio. Preferably, the non-aqueous electrolytic solution contains from 20 to 50% by mass of a cyclic carbonate and from 50 to 80% by mass of a low-viscosity solvent (low-viscosity non-aqueous solvent). In particular, a chain carbonate having a boiling point of not higher than 130° C. is desirably used as the low-viscosity solvent. By using such a non-aqueous electrolytic solution, the polymeric support can be favorably swollen with a small amount of the non-aqueous electrolytic solution, and it is possible to devise to make both suppression of swelling or prevention of the leakage of the battery and high conductivity much more compatible with each other.

When the ratio of the cyclic carbonate to the low-viscosity solvent falls outside the foregoing range, there is a concern that the conductivity of the electrolytic solution is lowered, and the cycle characteristics are lowered.

Examples of the chain carbonate having a boiling point of not higher than 130° C. include dimethyl carbonate, ethyl methyl carbonate and diethyl carbonate.

Also, what a halogen atom-containing cyclic carbonic ester derivative is contained as the foregoing cyclic carbonate in the non-aqueous electrolytic solution is more preferable because the cyclic characteristics are improved.

Examples of such a cyclic carbonic ester derivative include 4-fluoro-1,3-dioxolan-2-one and 4-chloro-1,3-dioxolan-2-one. These cyclic carbonic ester derivatives can be used singly or in combinations.

The content of the cyclic carbonic ester derivative is preferably from 0.5 to 2% by mass. When the content of the cyclic carbonic ester derivative is too low, an effect for enhancing the cyclic characteristics is small, whereas when it is too high, there is a concern that swelling at the time of high-temperature storage becomes large.

According to an embodiment, since the amount of the non-aqueous electrolytic solution existing between the polymeric support layer and the separator, the positive electrode or the negative electrode without being supported by any of them is low, even when the low-viscosity solvent having a low boiling point is used in an amount of 50% by mass or more, the swelling is suppressed to a low level.

In the non-aqueous electrolyte secondary battery according to an embodiment as described previously, the amount of the non-aqueous electrolytic solution existing within the battery, typically the pouring amount of the non-aqueous electrolytic solution is preferably from 0.14 to 0.35 g per $cm^3$ of the volume of this non-aqueous electrolyte secondary battery.

When the pouring amount of the non-aqueous electrolytic solution is less than 0.14 g per $cm^3$ of the volume of the battery, there is a concern that expected battery performances, specifically expected initial charge-discharge capacity and capacity retention rate cannot be realized, whereby when it exceeds 0.35 g, there is a concern that the resistance to liquid leakage is lowered.

Here, the pouring amount within the battery is, for example, measured by a method as described below.

First of all, a weight of the battery is measured; and subsequently, the battery element is taken out and then disassembled into the positive electrode, the negative electrode and the separator. Thereafter, the positive electrode, the negative electrode, the separator and the exterior member are immersed in a dimethyl carbonate solution for 2 days; and after filtration, vacuum drying is carried out for 3 days. A value obtained by subtracting the weight after vacuum drying from the initial weight is defined as the pouring amount.

Also, in the non-aqueous electrolyte secondary battery according to the present embodiment, it is preferable that a ratio (MO/MA) of the amount MO of the non-aqueous electrolytic solution existing between the battery element 20 and the exterior member 300 for a battery element to the amount MA of the non-aqueous electrolytic solution existing inside the exterior member 300 for a battery element is not more than 0.04.

When the thus defined MO/MA exceeds 0.04, there is a concern that swelling of the battery at the time of high-temperature storage cannot be sufficiently suppressed. Also, it is preferable that the MO/MA value is small as far as possible. Most desirably, the MO/MA value is 0. However, even when it is not more than 0.03, a more remarkable effect for suppressing swelling can be obtained.

Here, the amount MA of the non-aqueous electrolytic solution existing in inside the exterior member for a battery element, namely within the non-aqueous electrolyte secondary battery may be, for example, measured and calculated in the following method.

First of all, a mass of the battery is measured; and subsequently, the battery element is taken out and then disassembled into the positive electrode, the negative electrode and the separator. Subsequently, the positive electrode, the negative electrode, the separator and the exterior member for a battery element are immersed in a rinse liquid such as dimethyl carbonate for 2 days; and after filtration, vacuum drying is carried out for 3 days. Thereafter, a mass of the battery after vacuum drying is measured, and the mass of the battery after vacuum drying is subtracted from the initial mass of the battery, thereby determining MA.

On the other hand, the amount MO of the non-aqueous electrolytic solution existing between the battery element and the exterior member for a battery element, namely existing within the battery and outside the battery element may be, for example, measured and calculated in the following method.

First of all, a mass of the battery is measured, and the battery element is then taken out. Subsequently, the thus taken out battery element is interposed by a raw material capable of absorbing the non-aqueous electrolytic solution therein, for example, cloths, and all of the non-aqueous electrolytic solutions which have oozed out upon application of a load of 10 kPa are wiped off. Also, the exterior member from which the battery element has been taken out is immersed in a rinse liquid such as dimethyl carbonate and then dried. Thereafter, a total mass of the exterior member and the battery element having been subjected to a wiping-off treatment is measured, and the total mass of the exterior body and the electrode body after the wiping-off treatment is subtracted from the initial mass of the battery, thereby determining MO.

Next, one example of the manufacturing method of the foregoing battery element is described.

First of all, the positive electrode 210 is prepared. For example, in the case of using a granular positive electrode active material, a positive electrode active material and optionally, a conductive agent and a binder are mixed to prepare a positive electrode mixture, which is then dispersed in a dispersion medium, for example, N-methyl-2-pyrrolidone to prepare a positive electrode mixture slurry.

Subsequently, this positive electrode mixture slurry is coated on the positive electrode collector 210A and dried, and then compression molded to form the positive electrode active material layer 210B.

Also, the negative electrode 220 is prepared. For example, in the case of using a granular negative electrode active material, a negative electrode active material and optionally, a conductive agent and a binder are mixed to prepare a negative electrode mixture, which is then dispersed in a dispersion medium such as N-methyl-2-pyrrolidone to prepare a negative electrode mixture slurry. Thereafter, this negative electrode mixture slurry is coated on the negative electrode collector 220A and dried, and then compression molded to form the negative electrode active material layer 220B.

The polymeric support layer 230 is then formed on the separator 240. Examples of the technique for forming the polymeric support layer 230 on the separator 240 include a technique of coating a polymeric support-containing solution on the surface of the separator 240 and removing the solvent; and a technique of affixing a separately prepared polymeric support layer on the surface of the separator 240.

Examples of the technique for coating the polymeric support-containing solution on the surface of the separator 240 include a technique of immersing the separator in the polymeric support-containing solution; a technique of feeding and coating the solution by means of a T-die extrusion process or the like; and a technique of coating the solution on the surface of a base material by a spraying process or with a roll coater, a knife coater, or the like.

Examples of the technique of a desolvation treatment for removing the solvent include a technique of removing the solvent by drying; a technique of immersing the coated layer in a poor solvent of the polymeric support to remove the solvent by extraction and then drying and removing the poor solvent; and a combination of these techniques.

As the technique of affixing the separately prepared polymeric support layer to the surface of the separator 240, the adhesion can be achieved by using an adhesive. In that case, however, the adhesive must be adequately chosen according to the type of the electrolytic solution to be used (for example, an acid, an alkali, an organic solvent, etc.), and attention may be paid not so as to generate clogging.

Also, examples of technique for allowing the prepared polymeric support layer to come into intimate contact with the separator include heat fusion at a temperature of the gel transition point or higher. In particular, heat fusion while applying a pressure, for example, hot roll compression is preferable.

Subsequently, the positive electrode terminal 22a is installed in the positive electrode 210, and the negative electrode terminal 22b is also installed in the negative electrode 220. Thereafter, the separator 240 provided with the polymeric support layer 230, the positive electrode 210, another separator 240 of the same type and the negative electrode 220 are successively laminated and wound. The protective tape 250 is adhered onto the outermost peripheral part to form a wound electrode body.

Thereafter, an electrolyte salt such as lithium hexafluorophosphate and a non-aqueous electrolytic solution containing a non-aqueous solvent such as ethylene carbonate are prepared and poured into the inside of the wound electrode body, thereby holding the non-aqueous electrolytic solution in the polymeric support layer 230 to form an electrolyte. There is thus completed the battery element 20.

For example, pouring of the non-aqueous electrolytic solution can also be achieved in the state that the superimposed recess-provided sheet piece 300A and platy sheet piece 300B are sealed with each other except for one side (for example, a side parallel to the bending part 34), thereby forming a bag, into which is then housed the wound electrode body before pouring the electrolytic solution. By employing this technique, a precursor which will be a raw material for forming the polymeric support and the solvent can be removed in advance so that such a material or solvent does not remain within the electrolyte. Also, the step of forming the polymeric support can be favorably controlled. For that reason, it is possible to make the polymeric support layer come into intimate contact with the separator, the positive electrode or the negative electrode.

In the non-aqueous electrolyte secondary battery as described previously, when charged, a lithium ion is deintercalated from the positive electrode active material layer 210B and intercalated in the negative electrode active material layer 220B via the non-aqueous electrolytic solution held in the polymeric support layer 230. When discharged, a lithium ion is deintercalated from the negative electrode active material layer 220B and intercalated in the positive electrode active material layer 210B via the polymeric support layer 230 and the non-aqueous electrolytic solution.

Here, in the exterior member for a battery element to be included in the foregoing non-aqueous electrolyte secondary battery, the thick-walled part is formed in the bending part which is likely influenced especially by a heat stress, chemical changes of a resin layer and an adhesive layer, etc. during heat sealing for hermetically sealing the battery element. Thus, the exterior member for a battery element is hardly damaged by such influences and has excellent hermetic sealing properties.

Also, the thick-walled part is favorably formed by a lower pressure than that in other sealing part. However, since the area which is occupied by the thick-walled part is relatively small, there is brought an advantage that swelling of the battery to be caused due to penetration of water generated in the case of, for example, using an exterior member for a battery element in which all other sealing parts are formed under a low pressure can be avoided.

EXAMPLES

The present application according to an embodiment is hereunder described below in more detail with reference to the following Examples and Comparative Examples while referring to the accompanying drawings.

Example 1

First of all, cobalt carbonate ($CoCO_3$) was mixed in a proportion of 1 mole per 0.5 moles of lithium carbonate ($Li_2CO_3$), and the mixture was burned in air at 900° C. for 5 hours, thereby obtaining a lithium cobalt complex oxide ($LiCoO_2$) as a positive electrode active material.

Subsequently, 85 parts by mass of the obtained lithium cobalt complex oxide, 5 parts by mass of graphite as a conductive agent and 10 parts by mass of polyvinylidene fluoride as a binder were mixed to prepare a positive electrode mixture, which was then dispersed in N-methyl-2-pyrrolidone as a dispersion medium to form a positive electrode mixture slurry. Subsequently, this positive electrode mixture slurry was uniformly coated on the both surfaces of the positive electrode collector 210A composed of an aluminum foil and having a thickness of 20 μm, dried and then compression molded by a roll press to form the positive electrode active material layer 210B. There was thus prepared the positive electrode 210. Thereafter, the positive electrode terminal 22a was installed in the positive electrode 210.

On the other hand, a pulverized graphite powder was prepared as a negative electrode active material. 90 parts by mass of this graphite powder and 10 parts by mass of polyvinylidene fluoride as a binder were mixed to prepare a negative electrode mixture, which was then dispersed in N-methyl-2-pyrrolidone as a dispersion medium to form a negative electrode mixture slurry.

Subsequently, this negative electrode mixture slurry was uniformly coated on the both surfaces of the negative electrode collector 220A composed of a copper foil and having a thickness of 15 μm, dried and then compression molded by a roll press to form the negative electrode active material layer 220B. There was thus prepared the negative electrode 220. Subsequently, the negative electrode terminal 22b was installed in the negative electrode 220.

Also, polyvinylidene fluoride was used as a polymer compound to be used for the polymeric support layer 230. A solution of the subject polymer prepared by dissolving it in an N-methyl-2-pyrrolidone solution in an amount of 12 parts by mass was coated on the both surface of the separator 240 composed of a microporous film and having a thickness of 12 μm by a coating unit. This coated film was immersed in deionized water and then dried to form the polymeric support layer 230 having a thickness of 5 μm on the separator 240.

The thus prepared positive electrode 210 and negative electrode 220 were brought into intimate contact with each other via the separator 240 having the polymeric support layer 230 formed thereon and then wound in the longitudinal direction, and the protective tape 250 was stuck on the outermost periphery, thereby preparing the battery element 20.

Furthermore, the prepared battery element 20 was housed in the recess 32 of the recess-provided sheet piece 300A made of a laminated sheet. Subsequently, the bending part 34 was folded to superimpose the recess-provided sheet piece 300A and the platy sheet piece 300B. Thereafter, the peripheral part 36 of the two long sides was heat sealed using the level difference-provided heat bar as shown in FIG. 5C, thereby forming the sealing part 38 and the thick-walled part 40. There was thus obtained the exterior member 300 for a battery element in a bag form.

The sealing part 38 had a thickness of 180 μm, and the thick-walled part 40 had a thickness of 240 μm. Also, the length of the thick-walled part in the long side direction was 5% relative to the length of the long side of the exterior member for a battery element.

A moisture proof aluminum laminated film prepared by laminating a 25 μm-thick nylon film, a 40 μm-thickness aluminum foil and a 30 μm-thick polypropylene film in this order from the outermost layer was used as the laminated sheet. The thickness of the thick-walled part was thicker than a total thickness of the stuck two laminated sheets. It may be considered that this was caused due to the fact that the polypropylene film as a sealing resin flowed into the thick-walled part at the time of heat sealing.

Subsequently, an electrolytic solution was poured into the exterior member 300 for a battery element in a bag form having the battery element 20 housed therein, and the peripheral part of the remaining one side was heat sealed under a reduced pressure using the heater bar in a platy shape, thereby achieving hermetic sealing.

An electrolytic solution prepared by dissolving 1.2 moles/L of lithium hexafluorophosphate in a mixed solvent of ethylene carbonate and diethylene carbonate in a mass ratio of ethylene carbonate to diethylene carbonate of 3/7 was used.

Each of the secondary battery samples was charged and then stored for 20 days in a vacuum furnace (vacuum condition: not more than −0.1 MPa (gauge pressure), temperature within the furnace: 50° C.), followed by taking out from the vacuum furnace. The leakage of the contents of the battery from the bending part 34 of the exterior member was visually observed.

Comparative Example 1

A non-aqueous electrolyte secondary battery of this Comparative Example was obtained by repeating the same operations as in Example 1, except for changing the heater bar for heat sealing the long side to the heater bar in a platy shape as shown in FIG. 5A. The sealing part had a thickness of 180 μm.

<Leakage Test of the Contents of Battery>

Five samples for each of the secondary batteries of Example 1 and Comparative Example 1 were prepared and provided for this test.

Each of the secondary battery samples was charged and then stored for 20 days in a vacuum furnace (vacuum condition: not more than −0.1 MPa (gauge pressure), temperature within the furnace: 50° C.), followed by taking out from the vacuum furnace. The leakage of the contents of the battery from the bending part 34 of the exterior member 30 for a battery element was visually observed.

As a result, as to the secondary battery of Example 1, the leakage was not observed with respect to all of the five samples. On the other hand, the leakage was confirmed in four of the five samples with respect to the secondary battery of Comparative Example 1.

It has been noted from these results that the hermetic sealing properties of the secondary battery of the application is markedly enhanced as compared with those of the related-art product.

While the present application has been described in detail with respect to some embodiments and working examples, the present application is never limited to these embodiments and working examples, and various changes and modifications can be made therein without departing from the spirit and scope thereof.

For example, the polymeric support layer 230 is not an essential element and may be omitted.

The present application contains subject matter related to that disclosed in Japanese Priority Patent Application JP 2008-144781 filed in Japan Patent Office on Jun. 2, 2008, the entire contents of which is hereby incorporated by reference.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. An exterior member for a battery element comprising:
a first sheet piece made of a laminated sheet;
a second sheet piece made of the laminated sheet;
a bending part for partitioning the first sheet piece and the second sheet piece from each other;
a sealing part which is formed by a peripheral part of the first sheet piece in contact with a peripheral part of the second sheet piece corresponding to the peripheral part of the first sheet piece and which hermetically seals the battery element; and
a thick-walled part that is a portion of the sealing part and includes at least a part of the bending part,
wherein the thick-walled part has a greater thickness in a thickness direction of the battery element than a thickness of a portion of the sealing part other than the thick-walled part, and
wherein the thickness direction of the battery element corresponds to a stacking direction of the battery element.

2. The exterior member for a battery element according to claim 1, wherein a thickest portion of the thick-walled part has a thickness of from 1.2 to 3 times that of the portion of the sealing part other than the thick-walled part.

3. The exterior member for a battery element according to claim 1, wherein the exterior member for the battery element forms a rectangular shape in terms of a planar shape and has a length in the long side direction of the thick-walled part is not more than 80% relative to that of the long side thereof.

4. The exterior member for a battery element according to claim 1, wherein
the battery element forms a rectangular shape;
the first sheet piece and/or the second sheet piece has a recess; and
the battery element is housed in a space formed by the recess.

5. A non-aqueous electrolyte secondary battery comprising:
a battery element in a rectangular plate form having a positive electrode and a negative electrode wound therein via a separator; and
an exterior member for the battery element including
a first sheet piece made of a laminated sheet;
a second sheet piece made of the laminated sheet;
a bending part for partitioning the first sheet piece and the second sheet piece from each other;
a sealing part which is formed by a peripheral part of the first sheet piece in contact with a peripheral part of the second sheet piece corresponding to the peripheral part of the first sheet piece and which hermetically seals the battery element; and
a thick-walled part that is a portion of the sealing part and includes at least a part of the bending part,
wherein the thick-walled part has a greater thickness in a thickness direction of the battery element than a thickness of a portion of the sealing part other than the thick-walled part, and
wherein the thickness direction of the battery element corresponds to a stacking direction of the battery element.

6. The exterior member for a battery element according to claim 1, wherein the thick-walled part is formed by heat pressing the portion of the sealing part forming the thick-walled part at a lower pressure than the portion of the sealing part other than the thick-walled part.

7. The exterior member for a battery element according to claim 5, wherein the thick-walled part is formed by heat pressing the portion of the sealing part forming the thick-walled part at a lower pressure than the portion of the sealing part other than the thick-walled part.

* * * * *